(12) United States Patent
Kühler et al.

(10) Patent No.: US 7,219,439 B2
(45) Date of Patent: May 22, 2007

(54) MOUNTING AID FOR A POSITION MEASURING SYSTEM, AS WELL AS A SCALE AND POSITION MEASURING SYSTEM WITH THIS MOUNTING AID

(75) Inventors: Markus Kühler, Nussdorf/Sondermoning (DE); Giselher Schneider, Traunstein (DE)

(73) Assignee: Johannes Heidenhain GmbH, Traunreut (DE)

( * ) Notice: Subject to any disclaimer, the term of this patent is extended or adjusted under 35 U.S.C. 154(b) by 119 days.

(21) Appl. No.: 11/184,650

(22) Filed: Jul. 19, 2005

(65) Prior Publication Data
US 2006/0016090 A1    Jan. 26, 2006

(30) Foreign Application Priority Data
Jul. 21, 2004   (DE) .................... 10 2004 035 299

(51) Int. Cl.
  *B26D 7/28*   (2006.01)
(52) U.S. Cl. ............................ 33/706; 33/703; 33/1 PT
(58) Field of Classification Search .......... 33/701–703, 33/705–708, 1 N, 1 PT
See application file for complete search history.

(56) References Cited

U.S. PATENT DOCUMENTS

| | | | |
|---|---|---|---|
| 4,663,851 A | 5/1987 | Feichtinger | |
| 5,079,850 A * | 1/1992 | Rieder et al. | 33/705 |
| 6,739,067 B2 * | 5/2004 | Muller | 33/703 |
| 6,865,820 B2 | 3/2005 | Burgschat et al. | |
| 2005/0076527 A1* | 4/2005 | Mauermann | 33/706 |
| 2006/0021242 A1* | 2/2006 | Boge et al. | 33/706 |

FOREIGN PATENT DOCUMENTS

| | | |
|---|---|---|
| DE | 102 29 888 A1 | 1/2004 |
| EP | 0 177 711 B1 | 9/1990 |

\* cited by examiner

*Primary Examiner*—Yaritza Gudalupe-McCall
(74) *Attorney, Agent, or Firm*—Brinks Hofer Gilson & Lione

(57) ABSTRACT

A mounting aid for the alignment of a first graduation support in relation to a second graduation support of a position measuring system, the mounting aid including a spacer, which specifies a preset scanning distance between a first measuring graduation of the first graduation support and a second measuring graduation of the second graduation support. The mounting aid further including a connector having a structure to positively engage the first graduation support, wherein the connector is released from engagement with the first graduation support by displacing the connector with respect to the first graduation support and a protective cover that covers the measuring graduation.

19 Claims, 8 Drawing Sheets

MOUNTING AID FOR A POSITION MEASURING SYSTEM, AS WELL AS A SCALE AND POSITION MEASURING SYSTEM WITH THIS MOUNTING AID

Applicants claim, under 35 U.S.C. §119, the benefit of priority of the filing date of Jul. 21, 2004 of a German patent application, copy attached, Ser. No. 10 2004 035 299.2, filed on the aforementioned date, the entire contents of which is incorporated herein by reference.

BACKGROUND OF THE INVENTION

1. Field of the Invention

The present invention relates to a mounting aid for the alignment of a first graduation support of a position measuring system. The present invention further relates to a scale with a mounting aid for the alignment of the scale relative to a scanning unit of a position measuring system. The present invention also relates to position measuring system with a scale and a scanning unit.

2. Discussion of Related Art

A position measuring system contains two graduation supports, which are movable with respect to each other for a position-dependent modulation of a physical value. One of these graduation supports is the scale with a graduation, which can be designed to be incrementally or absolutely coded. In the course of the position measurement, this graduation of the scale is scanned by a graduation of a further graduation support. This graduation is a scanning graduation of a scanning plate or the arrangement of detector elements.

When being installed on parts of machinery, these two graduation supports must be aligned with respect to each other. An essential parameter in this case is the so-called scanning distance, i.e. the distance between the graduation of the scale and the graduation of the scanning unit.

Mounting aids for setting the scanning distance are already known. In accordance with EP 0 177 711 B1, the scanning unit has a slit, through which a foil of defined thickness can be introduced between the measuring graduation and the scanning graduation from the outside. The thickness of the foil corresponds to the required scanning distance. Adjusting the scanning distance is performed by moving the scanning unit until it clamps the foil. The scanning unit is screwed onto a part of a machine in the clamped state and thereafter the foil is removed by pulling it out of the slit. It is stated that the foil is included with the measuring device and possibly performs a further function as the warranty document.

A self-adhesive foil, whose thickness corresponds to the desired scanning distance, is provided for setting the scanning distance in DE 102 29 888 A1. The scale is protected against damage by the self-adhesive foil during the alignment and attachment. The disadvantage of a self-adhesive foil is the possible effect of remaining residue from the adhesive layer on the measuring graduation. Moreover, handling of the self-adhesive foil is impractical, since it can only be removed by pulling it off, for which a sufficient free space must be available after the installation of the scanning unit and the scale.

OBJECT AND SUMMARY OF THE INVENTION

It is therefore an object of the present invention to disclose a mounting aid for a position measuring system which can be better manipulated.

This object is attained by a mounting aid for the alignment of a first graduation support in relation to a second graduation support of a position measuring system, the mounting aid including a spacer, which specifies a preset scanning distance between a first measuring graduation of the first graduation support and a second measuring graduation of the second graduation support. The mounting aid further including a connector having a structure to positively engage the first graduation support, wherein the connector is released from engagement with the first graduation support by displacing the connector with respect to the first graduation support and a protective cover that covers the measuring graduation.

Accordingly, the mounting aid has a spacer, which defines the scanning distance. Connectors are formed on the mounting aid, which allow a positive and/or frictional connection between the graduation support and the mounting aid and fix the mounting aid in place on the graduation support in a positively or frictionally connected manner. In this fixed position, the mounting aid constitutes a protective cover for the entire measuring graduation available for position measuring. The connectors are designed in such a way that, following the alignment and mounting of the graduation supports, the mounting aid can be pulled out of the space between the two graduation supports. The mounting aid can be brought into engagement with the graduation support by being displaced in relation to it and can be released from it again.

On the one hand, the connectors make possible a defined linear displacement of the mounting aid on the graduation support, and on the other hand a fixation of the mounting aid on the graduation support in position, once the measuring graduation is covered by the mounting aid, wherein this position represents the mounted position.

The fixation in this mounted position has such dimensions that the operator can manipulate the graduation support by grasping the mounting aid and can bring it into the required mounting position. For this purpose, the mounting aid is embodied to be appropriately inherently stable and is provided with a handle. Fixation of the mounting aid on the graduation support takes place by a locking element which is snapped into the graduation support free of external aids. To make possible a simple and definite removal of the mounting aid after mounting has taken place, the positive connection used for the fixation can be released.

The present invention furthermore relates to a scale, as well as a position measuring system with a mounting aid in accordance with the present invention.

Further advantageous embodiments and advantages of the present invention are disclosed in the following description of exemplary embodiments by the drawings.

DETAILED DESCRIPTION OF THE PREFERRED EMBODIMENTS

Figure 1:
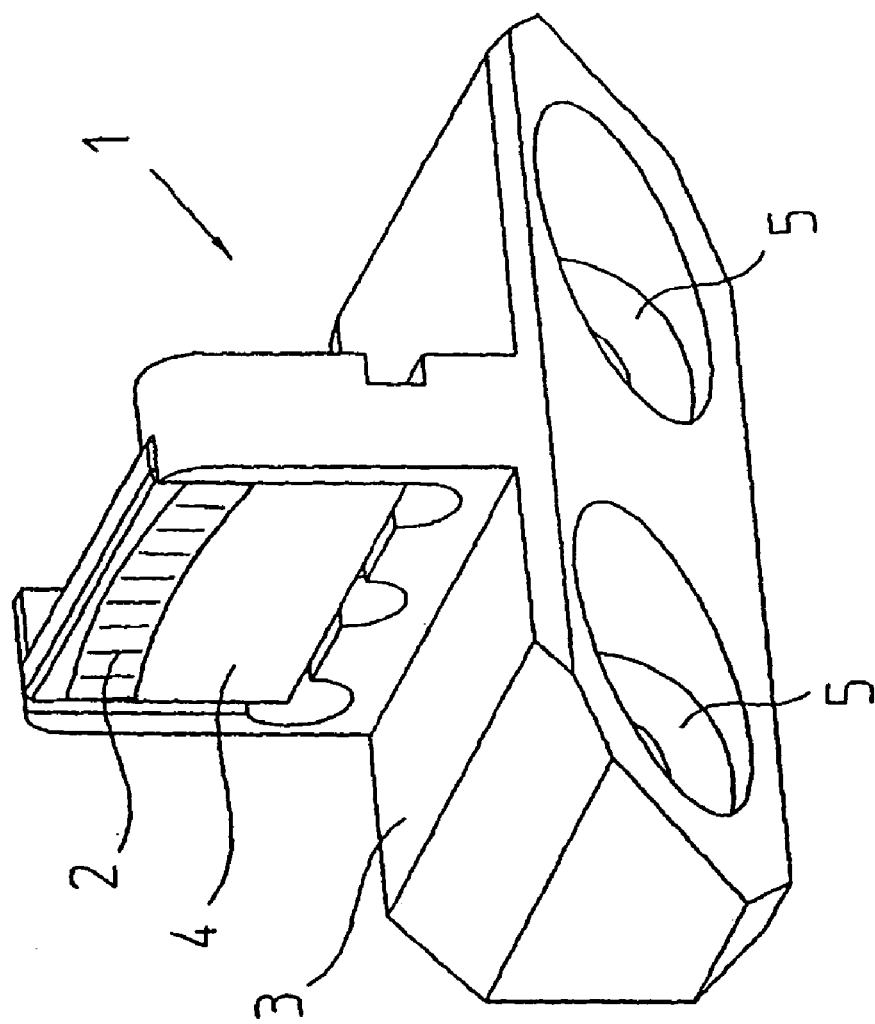
FIG. 1 represents a first perspective plan view of an embodiment of a scale in accordance with the present invention.
Figure 2:
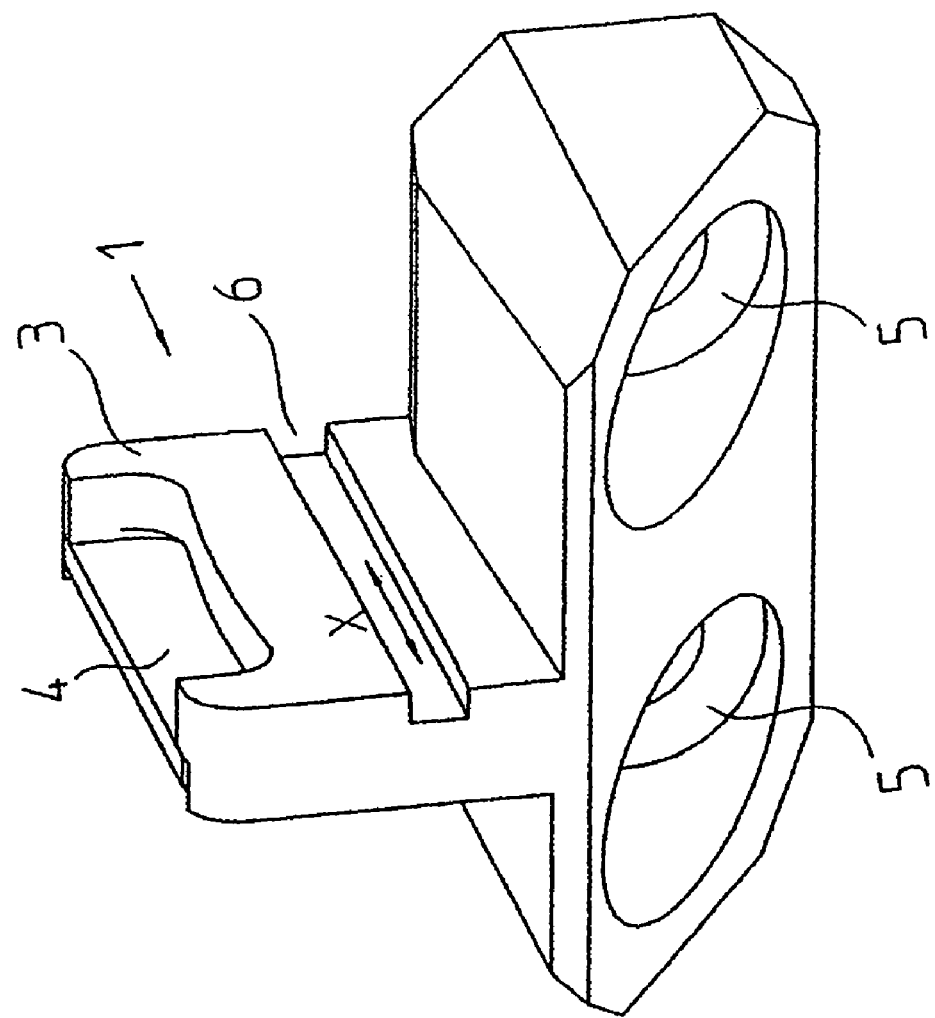
FIG. 2 represents a second perspective plan view of the scale of FIG. 1.

A scale 1 in the form of a graduation support with a measuring graduation 2 is represented in FIGS. 1 and 2. The scale 1 includes a holder 3 and a small glass plate 4 fastened thereon. Bores 5 have been drilled into the holder 3, by which the scale 1 can be rigidly fastened on a machine element 20 (FIG. 5) by screws.

Figure 3:
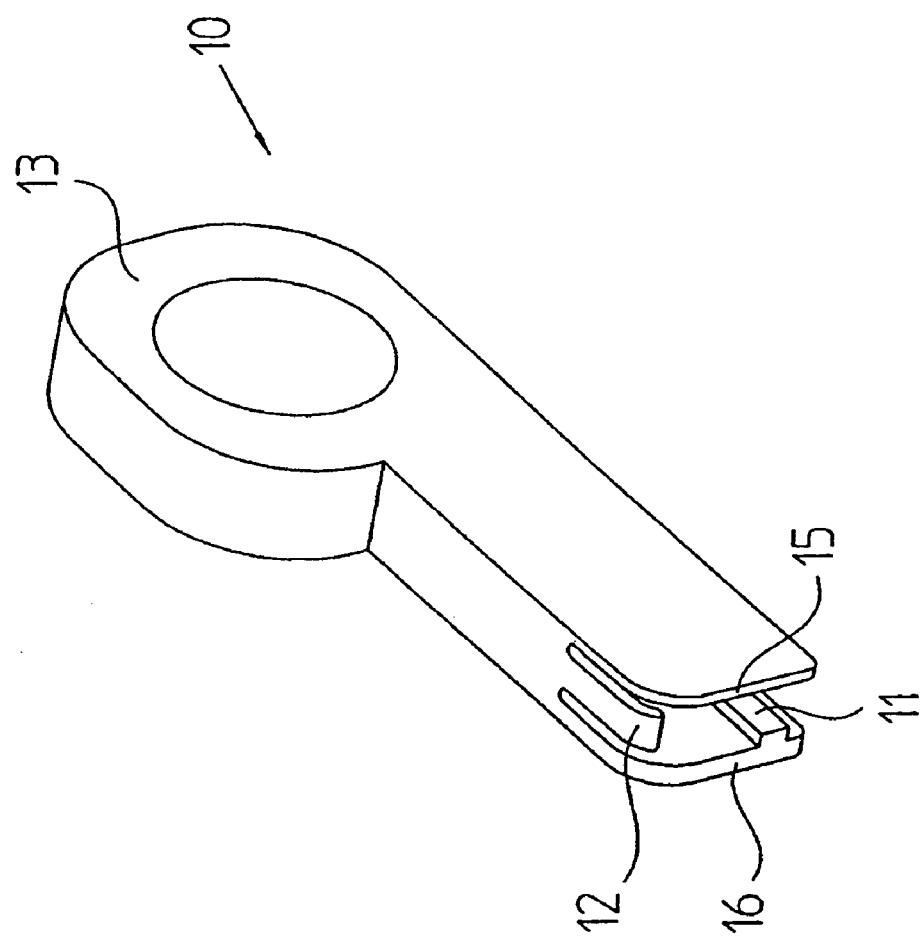
FIG. 3 shows a perspective plan view of an embodiment of a mounting aid to be used with the scale of FIG. 1 in accordance with the present invention.

A mounting aid 10 optimally matched to the scale 1 is represented in FIG. 3. This mounting aid 10 is laid out for being fixed in place on the scale 1, so that the scale 1 with the mounting aid 10 can be manipulated, and is also covered by the mounting aid 10 in the course of the manipulation of the measuring graduation 2.

For fixing the mounting aid 10 on the scale 1 without using tools, it has connectors 11, 12, which provide a positive connection with the scale 1. These connectors constitute a linear guide device 11, 6, including a tongue 11 which engages a corresponding groove 6 of the scale 1. In this way the mounting aid 10 can be pushed in a definite manner onto the scale 1, namely extending in the guide direction X perpendicularly with respect to the scanning distance A. Furthermore, a locking element 12 is formed on the mounting aid 10, which operates together with a corresponding locking element 7 of the scale 1 and forms a snap-in connection 12, 7 in the form of a positive connection. This snap-in connection 12, 7 fixes the mounting aid 10 in place on the scale 1 in the guidance direction X of the linear guide 11, 6 in the inserted state (mounting position). The locking element 12 of the mounting aid 10 is embodied as a resilient tongue, which in the pushed-in state projects past the scale 1 at the end area 7, i.e. as an undercut. The locking element 7 of the scale 1 can also be a notch.

It is advantageous if the guide direction X of the linear guide 11, 6 corresponds at least to a large extent to the measuring direction X. By this it is made possible that the connectors 11, 12 which provide the positive connection and/or the frictional connection do not slide over the area of the measuring graduation 2, but are supported over the entire displacement path exclusively outside the measuring graduation 2.

Figure 4:
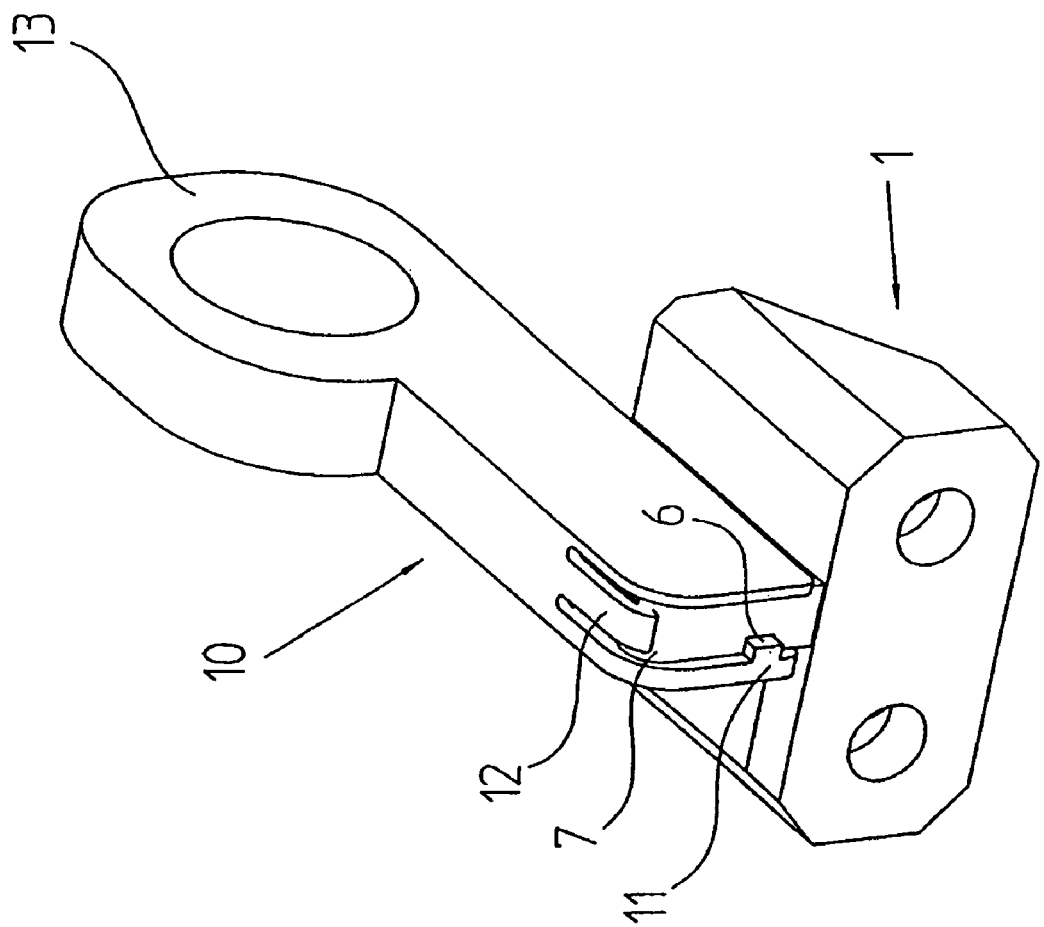
FIG. 4 shows the mounting aid in FIG. 3 fixed in place on the scale of FIG. 1.

As can be seen in FIG. 4, the mounting aid 10 covers the entire measuring graduation 2 used during the measuring operation for position measuring. The mounting aid 10 is an inherently stable component, which can be easily fixed in place on the scale 1 and can be removed without leaving any residue behind.

The snap-in connection 12, 7 can be additionally complemented by a frictional connection, in that the resilient tongue 12 generates an additional clamping force in the mounted position. Alternatively, the positive connection can be replaced or reinforced by a frictional connection in that, for example, the linear guide 11, 6 is embodied conically and clampingly fixes the mounting aid 10 in the mounted position on the scale 1.

For particularly small and difficult to handle scales 1 (approximately 1 cm×2 cm), the mounting aid 10 is provided with a handle 13 which is designed in such a way that it can be grasped by an operator and the scale 1 can be manipulated together with it. For example, the mounting aid 10 is an inherently stable molded element, in particular an injection molded element made of a (glass) fiber reinforced plastic material.

In connection with the highly accurate position measuring system explained by way of example, with a transparent small glass plate 4, which is scanned by transmitted light, it is particularly advantageous if the mounting aid 10 encloses the measuring graduation 2 in that the mounting aid 10 has two legs 15, 16, which extend parallel with respect to each other, constitute the protective covering and cover the measuring graduation 2 on both sides. It is assured by this that the small glass plate 4 is protected against dirt and mechanical damage while being transported and during mounting, and that the scanning beam path (FIG. 6) remains undisturbed during the subsequent position measurement.

The component represented in FIG. 4 shows the scale 1 in the state in which it is delivered to the customer. For installing it on a first machine element 20, the latter grasps the handle 13 and with its aid moves the scale 1 into the mounting position in accordance with FIG. 5. At the required mounting position, the scale 1 is rigidly connected to the first machine element, in the example shown is screwed on. Thus, the mounting aid is already fastened on the scale in the course of bringing the scale 1 and the scanning unit 40 together and protects the measuring graduation 2 used for position measuring over the entire available measuring path.

For the correct alignment of the scanning unit 40 in relation to the scale 1, the mounting aid 10 fixed in place on the scale 1 has a leg 16 with a reference face 14, which works together with the scanning unit 40 during the mounting. A surface 41 of the scanning unit 40 functions as a stop face on the reference face 14, as shown in a sectional view in FIG. 6. Thus the leg 16 of the mounting aid 10 forms a spacer, which defines the scanning distance A during the alignment and mounting of the scale 1 and the scanning unit 40. In connection with opto-electrical scanning, the scanning distance A is the spacing between the measuring graduation 2 and a scanning graduation 42 of the scanning unit 40.

Figure 6:
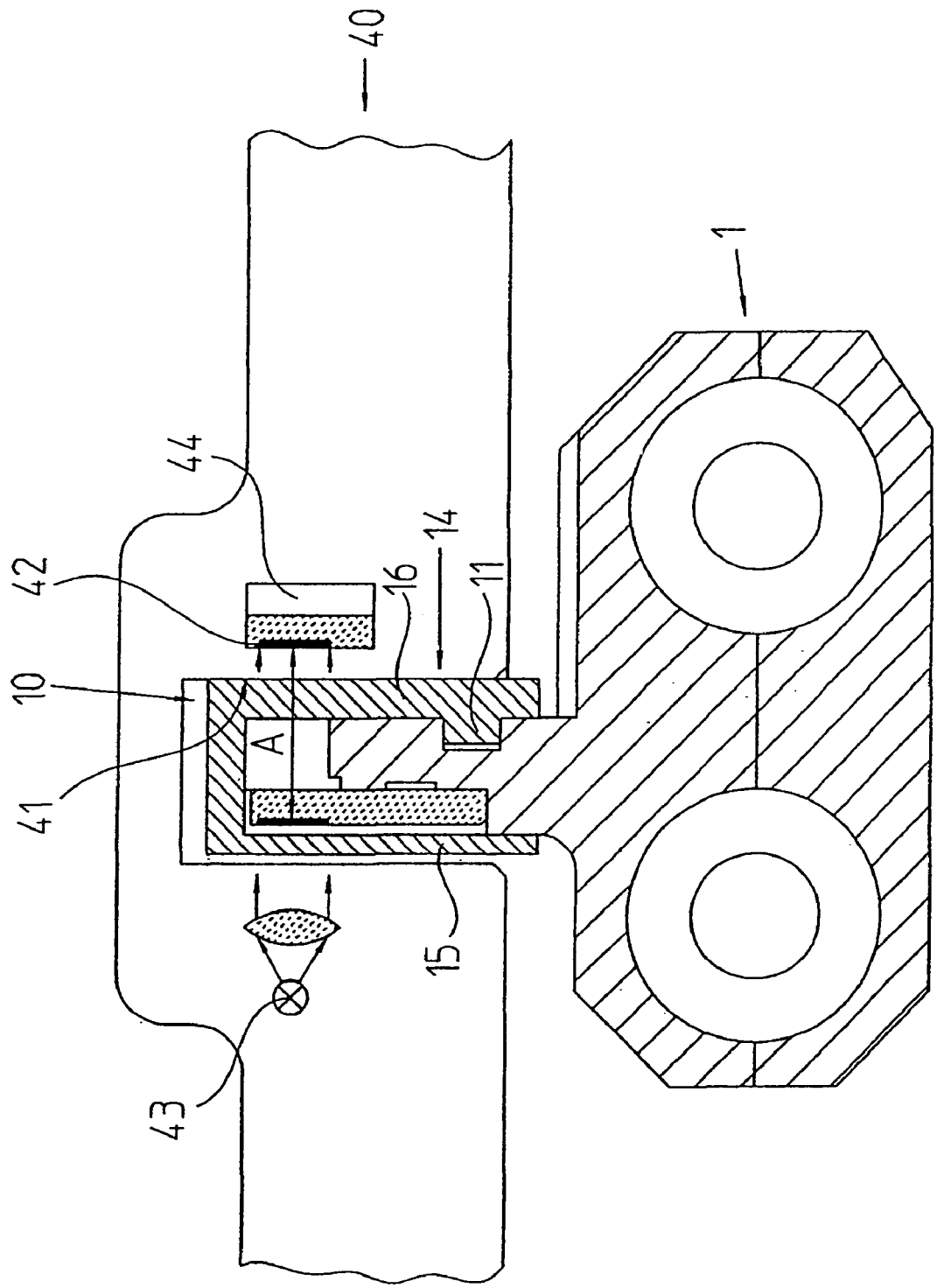
FIG. 6 shows an arrangement in accordance with FIG. 5 in cross section.

The light beam path in effect during the position measurement is schematically indicated in FIG. 6. The light from a light source 43 reaches the measuring graduation 2, is modulated there as a function of the position and, after passing through the scanning distance A, reaches the scanning graduation 42 and thereafter a light-sensitive detector unit 44.

Figure 5:
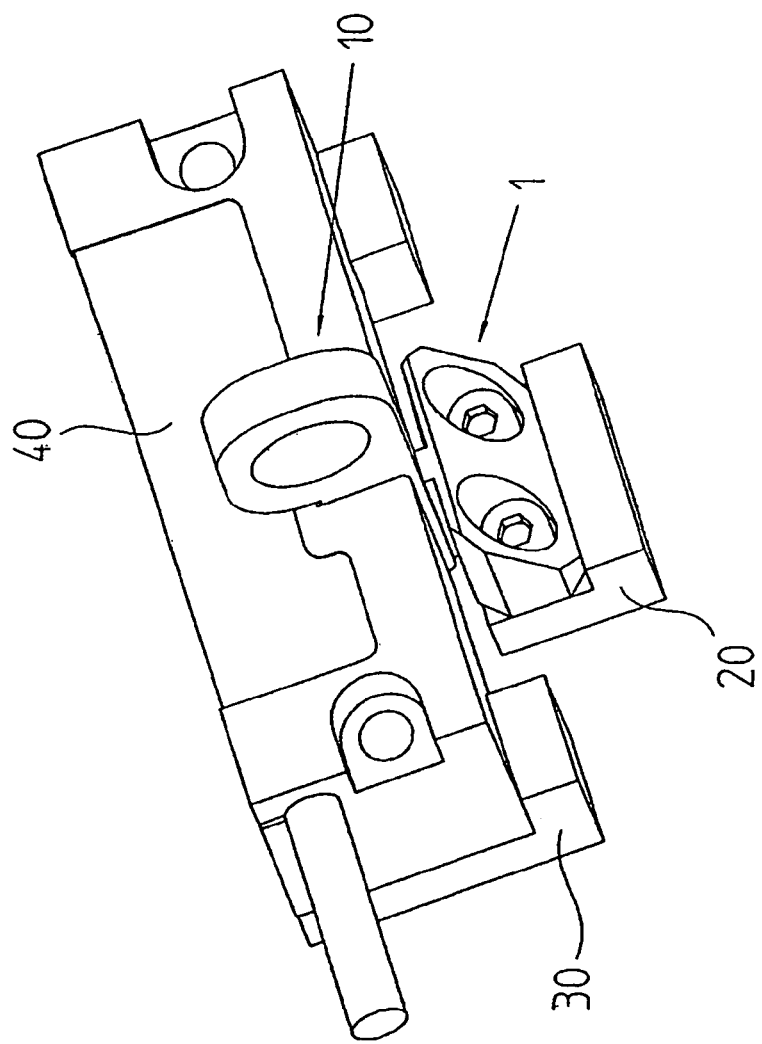
FIG. 5 represents a perspective plan view of the scale of FIG. 1 with the mounting aid of FIG. 3 during the alignment of an embodiment of a scanning unit at the scale of FIG. 1 in accordance with the present invention.
Figure 7:
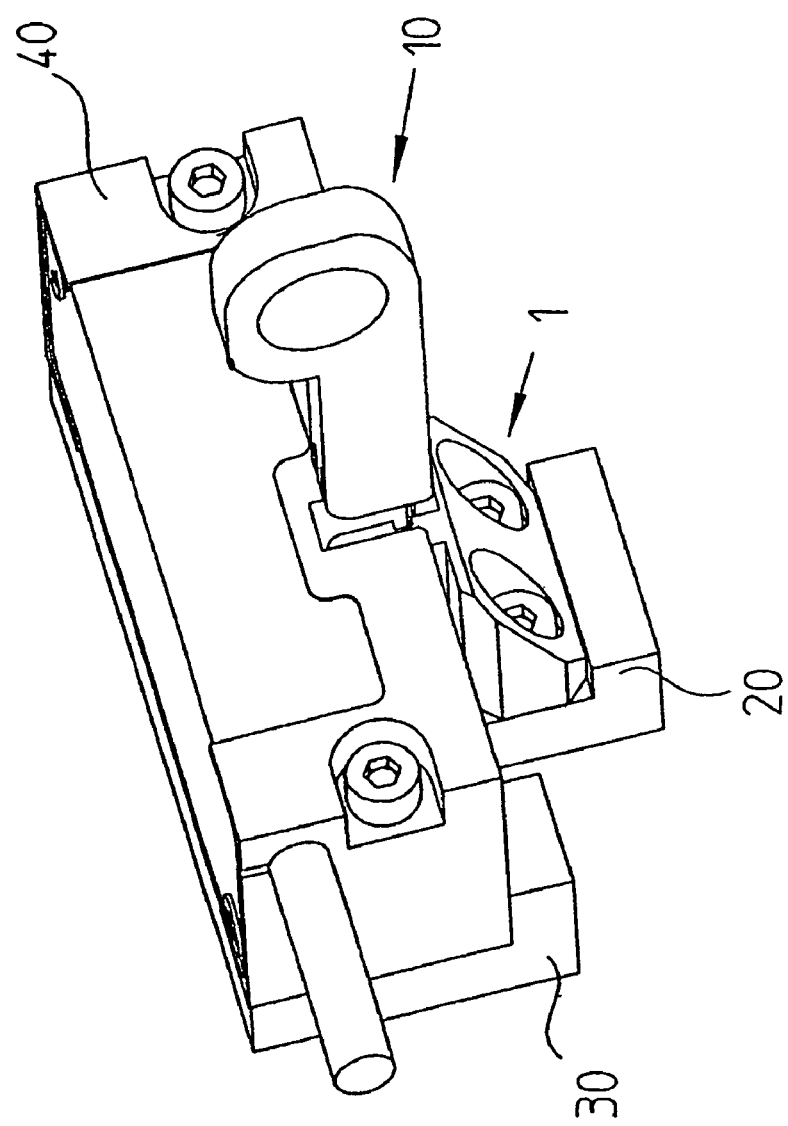
FIG. 7 represents the scale of FIG. 1 with the scanning unit of FIG. 5 aligned with it in the mounted state during the removal of the mounting aid of FIG. 3.

Following the alignment of the scanning unit 40 in relation to the scale 1 represented in FIGS. 5 and 6 and the rigid fastening of the scale 1 on the first machine element 20, as well as the scanning unit 40 on the second machine element 30, the mounting aid 10 is removed from the space between the scanning unit 40 and the scale 1 by pulling it out. In the course of this, the linear guide 6, 11 assures a definitely guided movement of the mounting aid 10 in the course of being removed. This state during the removal of the mounting aid 10 in the guide direction X is shown in FIG. 7. The position measuring system is now ready for measuring operations.

Figure 8:
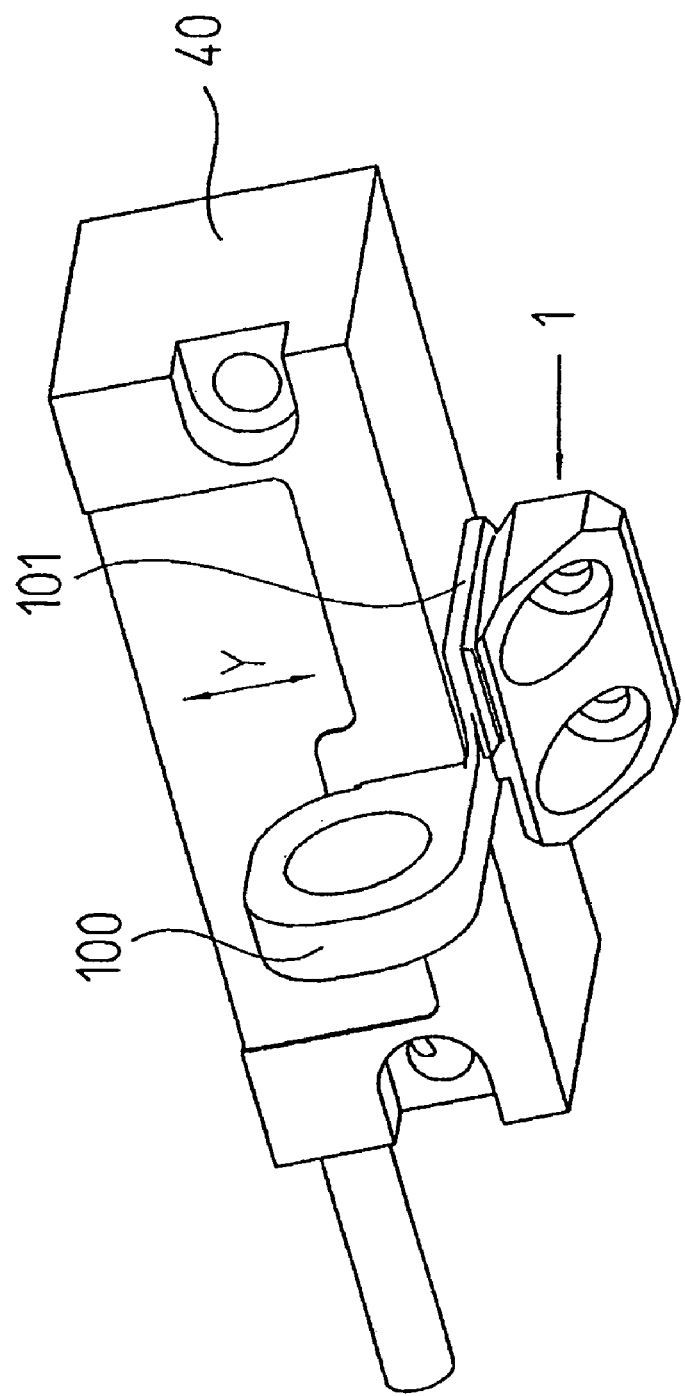
FIG. 8 represents a further embodiment of a mounting aid in accordance with the present invention.

FIG. 8 shows a further mounting aid 100. The construction corresponds to the previously described mounting aid 10, and was only complemented by further function elements. The mounting aid 100 has a leg 101, with which a mutual alignment of the scale 1 and the scanning unit 40 is made possible. In its Y direction, i.e. perpendicularly in relation to the measuring direction X and perpendicularly with respect to the scanning distance A, the leg 101 has a defined thickness and therefore fixes the assignment of the scale 1 and the scanning unit 40 to this direction Y.

The mounting aid 10, 100 is embodied in such a way that it protects the scale 1, represents a manipulating device in the form of a handle 13 for easy manipulation of the scale 1, which is advantageous in particular in connection with small scales 1, as well as makes available at least one reference face 14 of close tolerances for adjusting the scanning unit 40 with respect to the scale 1, or vice versa, in a spatial direction A or several spatial directions A, Y. The mounting aid 10, 100 does not rest against the scale 1 in the area of the measuring graduation 2. This can be realized in the manner represented, in that the measuring graduation 2 is set back with respect to the holder 3, against which the mounting aid 10 rests, or in a manner not represented, in that the mounting aid has one or several protrusions with which it is supported on the scale outside of the measuring graduation and makes a gap available between the small glass plate 4 and the mounting aid 10, 100 in the area of the measuring graduation 2.

The mounting aid 10, 100 remains on the scale 1 during transport as well as during the entire mounting process and in the mounted state can be pulled out of the space between the scale 1 and the scanning unit 40 by displacing it along the linear guide 6, 11. The mounting aid 10, 100 can be again used for the removal or mounting of a further scale.

In a manner not represented, the mounting aid with the described function elements can also be designed as a graduation support for the scanning unit 40. In this case the mounting aid is fixed in place on the scanning unit 40. The described positive connection or frictional connection is now provided between the mounting aid and the scanning unit 40 wherein, in the mounted position where it is fixed in place on the scanning unit 40, the mounting aid covers the scanning graduation 42 and protects it against dirt and damage.

The present invention has been explained in detail by means of a sector-shaped scale 1, which can be used for angle measurements. The scale, and therefore the measuring graduation, can also be designed to extend linearly or in the shape of a circle.

The scanning graduation in accordance with the present invention is a separate graduation, which is assigned to detector elements of the scanning unit 40. Alternatively, the scanning graduation in accordance with the present invention can also be constituted by the detector elements themselves by structuring the latter accordingly.

Further exemplary embodiments exist within the scope of the present invention besides the described examples.

We claim:

1. A mounting aid for the alignment of a first graduation support in relation to a second graduation support of a position measuring system, the mounting aid comprising:
   a spacer, which specifies a preset scanning distance between a first measuring graduation of said first graduation support and a second measuring graduation of said second graduation support;
   a connector having a structure to positively engage said first graduation support, wherein said connector is released from engagement with said first graduation support by displacing said connector with respect to said first graduation support; and
   a protective cover that covers said measuring graduation.

2. The mounting aid in accordance with claim 1, wherein said connector provides a snap-in connection with said first graduation support.

3. The mounting aid in accordance with claim 2, wherein said connector comprises a resilient tongue.

4. The mounting aid in accordance with claim 1, wherein said connector forms a linear guide.

5. The mounting aid in accordance with claim 4, wherein said linear guide is a tongue and groove joint.

6. The mounting aid in accordance with claim 1, wherein said protective cover is formed by a first leg and a second leg.

7. The mounting aid in accordance with claim 6, wherein said first leg and said second leg are positioned parallel to one another.

8. The mounting aid in accordance with claim 1, further comprising a handle designed in such a way that it can be grasped by an operator.

9. A mounting and alignment system for mounting and aligning a scale in relation to a scanning unit of a position measuring system, the mounting and alignment system comprising:
   a scale comprising a measuring graduation moving in a measuring direction;
   a mounting aid that is coupled to said scale, said mounting aid comprising:
      a spacer, which specifies a preset scanning distance between said measuring graduation and said scanning unit;
      a connector having a structure to positively engage said scale, wherein said connector is released from engagement with a graduation support that supports said measuring graduation by displacing said connector with respect to said scale; and
      a protective cover that covers said measuring graduation.

10. The mounting and alignment system in accordance with claim 9, wherein said connector comprises a first locking element and said scale comprises a second locking element wherein said first and second locking elements provide a snap-in connection between said scale and mounting aid.

11. The mounting and alignment system in accordance with claim 10, wherein said connector comprises a resilient tongue and said scale comprises a depression or an undercut that is engaged by said resilient tongue.

12. The mounting and alignment system in accordance with claim 9, wherein said connector forms a linear guide that is perpendicular to a direction along which said preset scanning distance is defined.

13. The mounting and alignment system in accordance with claim 12, wherein said linear guide is a tongue and groove joint.

14. The mounting and alignment system in accordance with claim 12, wherein said snap-in connection fixes said mounting aid in place in a mounted position in a guiding direction of said linear guide.

15. The mounting and alignment system in accordance with claim 9, wherein said mounting aid is designed to cover said measuring graduation without touching it.

16. The mounting and alignment system in accordance with claim 9, wherein said protective cover is formed by a first leg and a second leg which cover two oppositely located sides of said graduation support.

17. The mounting and alignment system in accordance with claim 16, wherein said first leg and said second leg are positioned parallel to one another.

18. The mounting and alignment system in accordance with claim 9, wherein said mounting aid comprises a handle designed in such a way that it can be grasped by an operator and is embodied to be inherently stable in such a way that said scale can be manipulated with said mounting aid.

19. A position measuring system comprising:

a scale comprising a first measuring graduation;

a scanning unit comprising a second measuring graduation that scans said first measuring graduation; and a mounting aid that is coupled to said scale so as to ensure that both said scale is separated from said scanning unit by a preset scanning distance and said scale is aligned in relation to said scanning unit, wherein said mounting aid comprises:

a spacer, which specifies said preset scanning distance;

a connector having a structure to positively engage said scale, wherein said connector is released from engagement with said scale by displacing said connector with respect to said scale; and a protective that covers said measuring graduation of said scale.

* * * * *